(12) United States Patent
Steffen et al.

(10) Patent No.: US 8,493,975 B2
(45) Date of Patent: Jul. 23, 2013

(54) COMMUNICATION SYSTEM

(75) Inventors: Rainer Steffen, Munich (DE); Wolfgang Hintermaier, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 382 days.

(21) Appl. No.: 12/818,583

(22) Filed: Jun. 18, 2010

(65) Prior Publication Data

US 2010/0254382 A1    Oct. 7, 2010

Related U.S. Application Data

(63) Continuation of application No. PCT/EP2008/010142, filed on Nov. 29, 2008.

(30) Foreign Application Priority Data

Dec. 21, 2007   (DE) .................... 10 2007 061 986

(51) Int. Cl.
*H04L 12/56*    (2006.01)
(52) U.S. Cl.
USPC .......................................... 370/389; 370/469
(58) Field of Classification Search
USPC .................................. 370/389, 469
See application file for complete search history.

(56) References Cited

U.S. PATENT DOCUMENTS

| | | | |
|---|---|---|---|
| 2003/0043750 A1* | 3/2003 | Remboski et al. ............ | 370/242 |
| 2004/0022238 A1* | 2/2004 | Kimmitt ....................... | 370/366 |
| 2004/0073703 A1* | 4/2004 | Boucher et al. .............. | 709/245 |
| 2004/0213295 A1* | 10/2004 | Fehr .............................. | 370/503 |
| 2006/0184710 A1* | 8/2006 | Valdivia et al. .............. | 710/315 |
| 2007/0032916 A1 | 2/2007 | Mark | |
| 2007/0047572 A1* | 3/2007 | Desai et al. ................... | 370/463 |

(Continued)

FOREIGN PATENT DOCUMENTS

| | | |
|---|---|---|
| DE | 198 51 245 A1 | 12/1999 |
| DE | 103 29 871 A1 | 1/2005 |
| DE | 10 2004 020 880 A1 | 11/2005 |
| DE | 10 2004 005 680 A1 | 8/2008 |

OTHER PUBLICATIONS

Nikoloutsos, E. et al., "Integrating IP Traffic into Fieldbus Networks", Industrial Electronics, 2002, ISIE 2002, Proceedings of the 2002 IEEE International Symposium on Jul. 8-11, 2002, Piscataway, NJ, USA, IEEE, vol. 1, Jul. 8, 2002, pp. 67-72. XP010598147.

(Continued)

*Primary Examiner* — Brian D Nguyen
(74) *Attorney, Agent, or Firm* — Crowell & Moring LLP

(57) ABSTRACT

A communication system is provided with a plurality of FlexRay network nodes (FRK) by which respective data packets are provided in an IP data packet format or an Ethernet data packet format, and a FlexRay bus system (FRB), by whose physical layer, data are transmitted between the FlexRay network nodes (FRK). The IP data packet format or the Ethernet data packet format each has a plurality of bit positions. The FlexRay network nodes (FRK) each include a media access layer (MAC) which is set up such that the data packets provided in an IP data packet format or Ethernet data packet format are converted into a preset media-independent data format (MII), and an adaptation layer (ANP) which is set up such that the data provided in the media-independent data format (MII) are converted onto corresponding signals of the physical layer of the FlexRay bus system (FRB).

3 Claims, 6 Drawing Sheets

U.S. PATENT DOCUMENTS

2008/0016249 A1* 1/2008 Ellis et al. .................... 709/248
2008/0137855 A1* 6/2008 Enomoto et al. ............. 380/255
2008/0140949 A1* 6/2008 Hartwich et al. ............ 711/154

OTHER PUBLICATIONS

International Search Report dated Mar. 26, 2009 with English translation (six (6) pages).

German Search Report dated Jul. 28, 2008 with English translation (nine (9) pages).

FlexRay Consortium: "FlexRay Requirements Specification Version 2.1", Dec. 19, 2005, pp. 1-115.

* cited by examiner

COMMUNICATION SYSTEM

CROSS-REFERENCE TO RELATED APPLICATIONS

This application is a continuation of PCT International Application No. PCT/EP2008/010142, filed Nov. 29, 2008, which claims priority under 35 U.S.C. §119 from German Patent Application No. DE 10 2007 061 986.5, filed Dec. 21, 2007, the entire disclosures of which are herein expressly incorporated by reference.

This application contains subject matter related to U.S. application Ser. No. 12/818,591, entitled "Communication System," filed on even date herewith.

BACKGROUND AND SUMMARY OF THE INVENTION

The invention relates to a communication system, particularly for a motor vehicle.

The so-called FlexRay standard ("FlexRay") is currently establishing itself for the data transmission between motor vehicle control units, which standard is described by a preset protocol specification.

FlexRay has the purpose of meeting the increased demands of future networking in the vehicle, particularly a higher data transmission rate, a real-time capability and a fail-safe capacity. However, the current focus is primarily on the higher data rate which is necessary today as a result of the continuous increase of distributed applications, such as driver assistance systems, in premium vehicles.

In order to operate a FlexRay network node, such as a control unit, on a FlexRay bus, as a rule, two components are used: the bus transceiver and the communication controller. The bus transceiver establishes the direct connection to the data line: on the one hand, it writes the logical information, which is to be sent, in the form of voltage pulses onto the bus; on the other hand, it reads out the signals which are sent by other users on the bus. This layer is called a physical bit transfer layer or physical layer.

In addition, the FlexRay standard includes the bus protocol. The bus protocol controls how a network starts, how bus timing is established and which control units are permitted to send at which point-in-time. The communication controller converts the bus protocol in each control unit. It, for example, packages the information to be transmitted in a data packet and, at the correct point in time, transfers this data packet to the bus transceiver for transmission.

The Internet Protocol (IP) is a network protocol that is widespread in computer networks. It is a (or the) implementation of the Internet layer of the TCP/IP reference model or of the network layer of the OSI reference model. The IP forms the first layer of the Internet protocol family that is independent of the transmission medium. An IP address (Internet protocol address) is used for the unambiguous addressing of computers and other devices in an IP network.

Communication systems are known which include a media access control layer (MAC layer) by which the access to the transmission medium is controlled and by which, for example, multiplex processes can be controlled.

In addition, a media-independent interface (MII) is known and standardized by which a media access layer, particularly an Ethernet layer or data packets provided in the Ethernet data packet format, can be converted onto a physical layer.

It is now an object of the invention to specify a communication system that is improved with respect to the prior art.

A communication system according to the invention comprises a plurality of FlexRay network nodes by which respective data packets in an IP data packet format or Ethernet data packet format are provided, particularly are generated, transmitted, temporarily stored and/or modified. The IP data packet format or the Ethernet data packet format each has a plurality of bit positions which are provided for the transmission of preset types of information. By way of the physical layer of a FlexRay bus system, data are transmitted between the FlexRay network nodes. The FlexRay network nodes each comprise a software-type and/or hardware-type media access layer (MAC) which is set up such that the data packets provided in an IP data packet format or Ethernet data packet format are converted to a preset media-independent data format (in the following, also called data packet format) which is preset particularly by the so-called MII (media independent interface) standard or a standard (for example, the RMII, SMII, SMII, etc.) derived therefrom or based thereon. The FlexRay network nodes each comprise a software-type or hardware-type adaptation layer which is set up such that the data provided in the media-independent data format, particularly data packets, are converted onto corresponding signals of the physical layer of the FlexRay bus system.

In this case, preferably before a conversion onto the preset signals of the physical layer of the FlexRay bus system, the data packets or data are not converted or packaged into FlexRay data frames. A FlexRay network node according to the invention therefore preferably differs from a conventional FlexRay network node in that, by means of it, data packages are provided in an IP data packet format or an Ethernet data packet format, and in that—without a temporary storage in the form of FlexRay data frames (with a corresponding preset data format)—these are imaged by way of a correspondingly set-up media access layer on the physical layer of the FlexRay bus system (FRG) which is known per se and preset, particularly standardized. By the use of a media access layer (MAC), which is known per se, is well tested, and widely used, together with the use of a media-independent data format associated therewith and also known per se and well tested, the IP or Ethernet technology can be combined in a reliable manner and at low expenditures with the FlexRay Technology known per se from the motor vehicle field.

As a result, it is achieved that IP data packets or Ethernet data packets, which may originate from a plurality of known program-related or hardware-related devices, can be transmitted by way of a proven suitable physical layer which was tested particularly for motor-vehicle-related environments. Because of the fact that the rigid logical framing of the FlexRay bus system is not applied, which framing is determined essentially by the FlexRay data frame structure and the FlexRay time slot structure, but instead IP data packets and Ethernet data packets are imaged indirectly by way of the media-independent layer, particularly the MII layer, onto the physical layer, the flexibility advantages and cost advantages of the IP/Ethernet technology can be combined with the advantages of the FlexRay technology. On the whole, a stable, reliable, flexible, efficient and economically implementable communication system is created, particularly for a motor vehicle.

Conventional FlexRay network nodes can naturally also be provided in the communication system in addition to the FlexRay network nodes configured according to the invention.

The FlexRay network nodes may naturally also be set up such that, in addition to the conversion of data onto the physical FlexRay layer according to the invention, the FlexRay network nodes may also carry out a conventional conversion of data onto the physical FlexRay layer, in which case the data may previously have been packaged in FlexRay data frames.

Within the scope of the invention, an IP data packet includes data packets formed according to the Internet protocol but also data packets that are derived from such an Internet-protocol-conformal data packet or are formed in conformity with such data packets according to the Internet protocol. For example, within the scope of the invention, an IP data packet also includes data packets which are formed according to the Internet protocol but which have further data, or parts of data packets which are formed according to the Internet protocol. Likewise, within the scope of the invention, the term "IP data packet" includes data packets which directly or indirectly originate from an Internet protocol layer. As a rule, the IP data packet has an IP address or destination address.

Depending on the embodiment, the FlexRay bus system and/or the FlexRay network nodes may be devices which are modified or "shed" with respect to a conventional FlexRay bus system and/or conventional FlexRay network nodes. Within the scope of the invention, a FlexRay network node therefore also includes network nodes which execute or comprise only the physical layer of a FlexRay protocol. Correspondingly, within the scope of the invention, a FlexRay bus system includes a bus system or bus protocol which only executes or comprises the physical layer of the FlexRay protocol. The other layers may be completely or partially executed according to other protocols or specifications that are, for example, known per se.

A communication system which includes an IP network and a FlexRay bus system is particularly flexible, in which case the IP network is coupled with the FlexRay bus system by way of a router.

By means of the adaptation layer, the contents of the bit positions of the data or data packets provided in the media-independent data format or data packet format are preferably each converted onto corresponding signals of the physical layer of the FlexRay bus system (FRB). In this case, the FlexRay network nodes are set up such that contents of the bit positions of the data or data packets in the media-independent data format or data packet format are converted particularly indirectly or directly in each case onto corresponding signals, signal shapes, pulse shapes or signal pulses of the physical layer of the FlexRay bus system (FRB).

The FlexRay bus system, particularly the physical layer of the FlexRay bus system, is preferably based on two physical FlexRay channels (first channel and second channel). For this purpose, a communication control device, the media access layer or the adaptation layer of at least one FlexRay network node is set up such that the physical layer of the FlexRay bus system includes a first and a second physical channel.

In addition, the communication control device, the media access layer or the adaptation layer is advantageously set up such that data are sent by way of the first channel and data are received by way of the second channel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
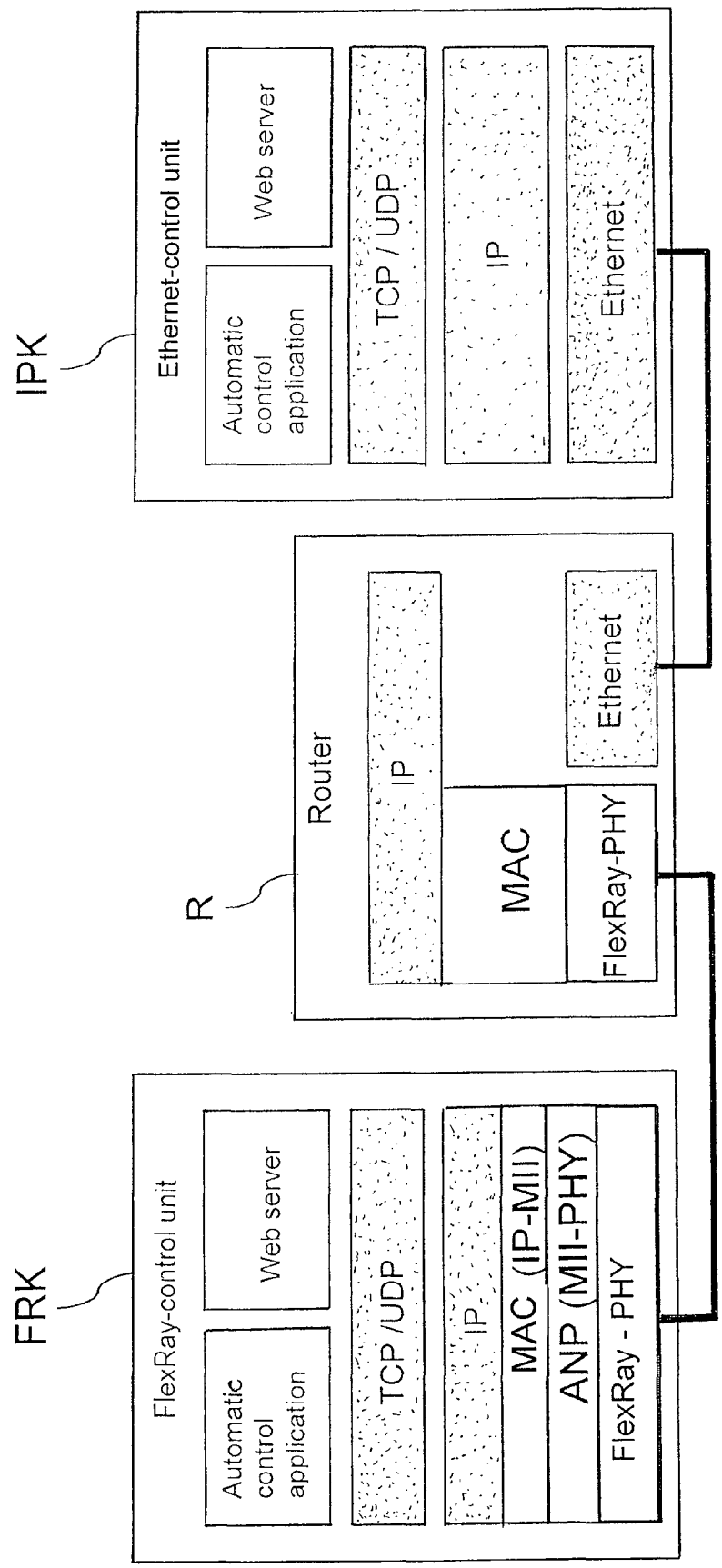
FIG. 1 is a view of a simplified protocol layer representation of a simplified communication system.

FIG. 1 illustrates an example of a FlexRay network node FRK and an IP network node with the pertaining protocol layers. The FlexRay network node FRK and the IP network node IPK are mutually coupled by means of a router R.

In the case of the FlexRay network nodes FRK, the bottom layer (bit transfer layer, physical layer) is formed or determined by the FlexRay specification or the corresponding layer of the FlexRay protocol (FlexRay-PHY). An adaptation layer to be discussed later and a media access layer to be discussed later are situated above the bottom layer. The IP (Internet Protocol) layer is situated as the network layer above the media access layer. For example, the transmission control protocol (TCP) or the user datagram protocol (UDP) is situated as the transport layer above the IP (Internet protocol) layer. Different applications are implemented in the application layer above the transport layer.

Data are generated by the applications and are forwarded in a defined form to the transport layer. By way of the transport layer, these data are updated particularly by control data and are forwarded in a defined form to the network layer. By way of the network layer, the data, further updated particularly by control data, are packaged into IP data packets.

The IP data packets provided by the IP layer IP of the FlexRay network node FRK are converted by a media access layer MAC into a standardized media-independent MII data format that is known per se and can determine the logical and/or physical structure of the data to be transmitted (IP-MII).

By use of a correspondingly set-up adaptation layer ANP, these data are transferred to the FlexRay layer, particularly are converted directly onto the physical layer of the FlexRay protocol. For the physical bit transfer, by way of the adaptation layer, the logical values of the bit positions of the data or of the data packet in the MII data format or MII data packet format are converted corresponding to the inputs of the FlexRay protocol into physical signals and are transmitted by way of the FlexRay bus, particularly the corresponding physical lines. For the reception of data by a FlexRay network node FRK, this sequence can take place in the reversed direction.

The corresponding physical signals are received by the router R and are imaged by way of a corresponding media access layer MAC back into corresponding IP data packets. This can be the same media access layer together with the corresponding adaptation layer (not shown) or a different media access layer. The IP data packets can then be switched in a manner known per se from the router by way of the Ethernet to a destination IP network node IPK.

In the case of the IP network nodes IPK, the bottom layer (bit transfer layer) is formed by the Ethernet protocol or the corresponding layer of the Ethernet protocol. As the network layer, the IP (Internet protocol) layer is situated above the latter. For example, the transmission control protocol (TCP) or the user datagram protocol (UDP) is situated as the transport layer above the Internet protocol layer. Various applications are implemented in the application layer above the transport layer.

In addition, by way of the media access layer MAC, a more flexible media access process can be implemented in comparison with the TDMA (time division multiple access) of the FlexRay specification. Particularly the following processes, which are known per se, are especially advantageous:

Aloha process: As soon as the data are applied for the transmission, they are sent onto the bus. Since, during the transmission, collisions may occur as a result of simultaneously sending nodes, each transmitted data packet will be confirmed.

Carrier Sense Multiple Access (CSMA): Before the bus is accessed in order to send, it is checked whether another node is already transmitting a message (carrier sense). If this is not so, the bus can be accessed. Should the bus currently be occupied, different strategies can be used for the further observation of the bus condition:

1-persistent: As soon as it is recognized that the bus is unoccupied, the transmission will be started. Should several nodes want to send simultaneously, collisions could occur.

Non-persistent: After the detection of an occupied channel, a waiting period will take place for a random back-off time before it is attempted again to access the bus.

p-persistent: As soon as it detected that the bus is unoccupied, the sending onto the bus will take place with a probability of p and a defined waiting period will occur with a probability of 1-p.

If the physical layer is capable of detecting a collision, this information can be used for solving access conflicts. One method of solving access conflicts consists of waiting for a random time period after a collision before another access takes place to the medium.

Prioritized CSMA (carrier sense multiple access): A priority can be assigned to the data packets as a result of a variation of the waiting periods before the bus may be accessed.

Master slave: In order to permit a deterministic time behavior, there is the possibility of regulating the bus access by way of a master/slave method. In this case, at least one master exists in the system and regulates the access by the bus users by explicitly and exclusively assigning send rights to them.

In addition, there is the possibility of securing the transmitted data packets in each case by an acknowledgement packet (ACK) or a no-acknowledgement packet (NACK). If necessary, a new transmission of the lost data packet can then be carried out.

Figure 2:
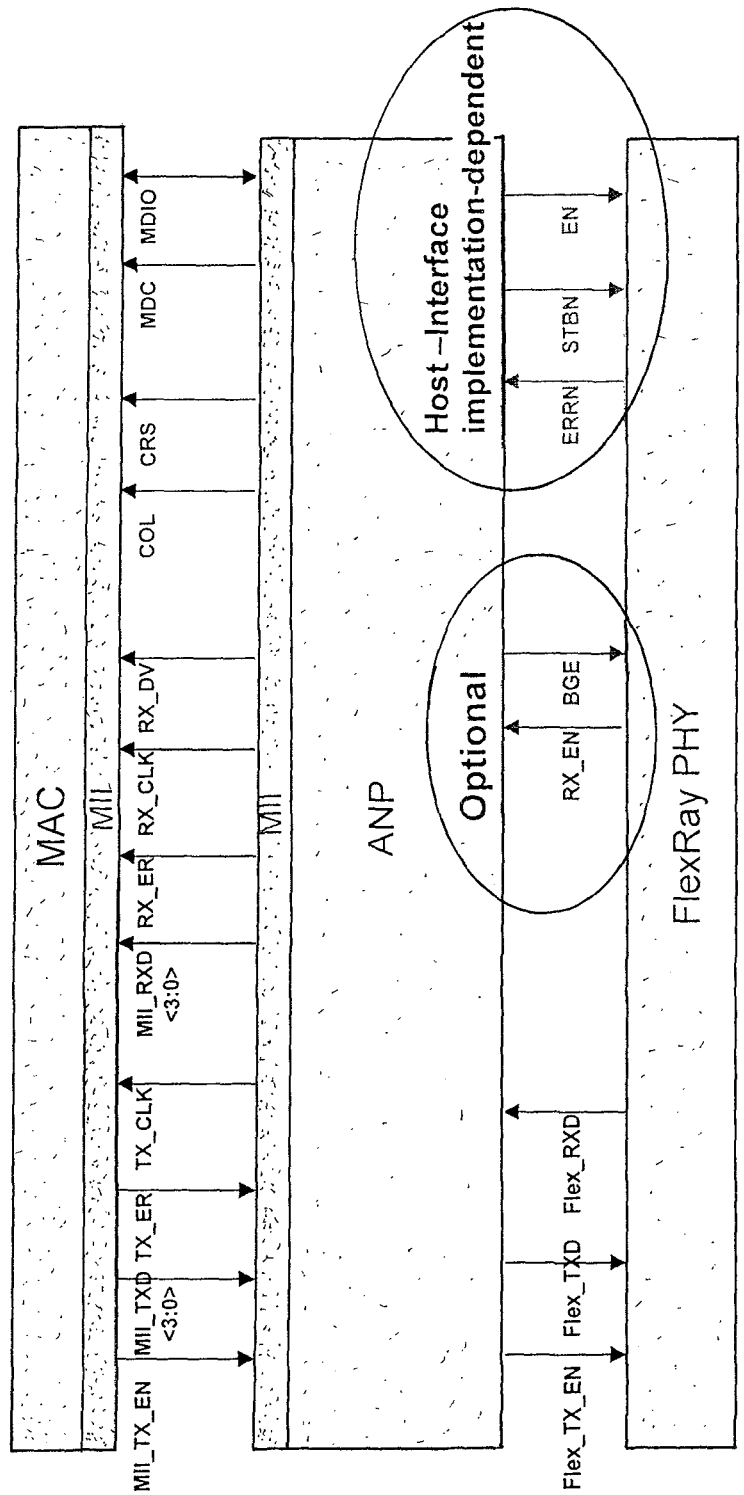
FIG. 2 is a view of an extract of a simplified protocol layer representation of a FlexRay network node.

The adaptation layer ANP which, by way of the media access layer, receives data in the MII format, is appropriately set up—as illustrated in detail in FIG. 2—for imaging the data in the MII format onto data or signals in the format of the physical FlexRay layer. An example of a suitable software-related and/or hardware-related device will be explained in detail in the following. In each case, the significance of the individual MII bit position or MII signals will be indicated and it will be explained which actions will thereby be triggered by means of the adaptation layer:

MII_TX_EN:

A High signal at MII_TX_EN indicates that data on the MII data bus MII_TXD are being made available for transmission. This signal is set synchronously with the transmission of the first data nibble (MII_TXD <3:0>) and maintains its condition as long as data are transmitted to TXD. In order to inform the transmitter that data are available for transmission, the adaptation layer ensures that the following signals are switched on the transmitter (physical layer): Flex_TX_EN→LOW: As soon as the data transmission has been concluded (MII_TX_EN=LOW), the following signals will be switched at the transmitter: Flex_TX_EN→HIGH.

MII_TXD:

The MII_TXD consists of 4 signals (MII_TXD <3:0>). By way of these signals, the data to be transmitted from the terminal are transferred from the MAC layer by way of the adaptation layer to the transmitter (physical layer). The transmission takes place synchronously with respect to the clock signal TX_CLK. Of the MII_TXD signals, MII_TXD <0> represents the bit with the lowest place value. The TXD <3:0> signals are converted synchronously with respect to the TX_CLK cycle in the adaptation layer from a parallel signal into a serial signal and are transferred to the Flex_TXD signal of the transmitter (physical layer), if MII_TX_EN was set.

TX_ER:

This signal indicates a "transmission coding error" and, if the latter occurs, is triggered synchronously with respect to the TX_CLK cycle (HIGH signal). Since the data transmission in the transmitter (physical layer) takes place at 10 Mb/s, the IEEE 802.3 Standard provides that the setting of this signal (TX_ER HIGH) should have no effect on the transmitter (physical layer). With respect to the adaptation layer, it follows that this signal can be ignored by the MII.

TX_CLK:

This signal represents a continuous clock signal which is used as a time reference for the transfer of the following signals from the MAC layer to the transmitter (physical layer): MII_TX_EN, MII_TXD, TX_ER. This clock signal is provided by the adaptation layer in order to make available the time reference for the data exchange of the above-mentioned signals. The TX_CLK frequency should be 25% of the nominal data rate (+−) 100 ppm. The duty cycle should be between 35% and 65%.

RX_CLK:

This signal represents a continuous clock signal which is used as a time reference for the transfer of the following signals from the transmitter (physical layer) to the MAC layer: RX_DV, MII_RXD, RX_ER. This clock signal is made available by the adaptation layer in order to provide the time reference for the data exchange of the above-mentioned signals. This clock signal can be derived either from the received data or can be provided as a nominal clock signal. As long as the RX_DV signal has been set, the clock signal TX_CLK should be in synchronism with the "recovered" (received) data. The RX_CLK frequency should amount to 25% of the nominal data rate. The duty cycle should be between 35% and 65%.

RX_DV:

This signal indicates that the transceiver (physical layer) emits decoded signals by way of the adaptation layer to MII_RXD <3:0> and that these are synchronous with respect to the RX_CLK. This signal is set to be synchronous with respect to the RX_CLK signal and remains set for that long. It should remain constantly set from the first to the last received MII_RXD <3:0> nibble. This signal should be set back before the RX_CLK signal that follows the last MII_RXD <3:0> nibble. This signal is generated by the adaptation layer as a function of the Flex_RXD and ERRN signals of the transceiver (physical layer).

MII_RXD:

The MII_RXD consists of 4 signals (MII_RXD <3:0>). By way of these signals, the data received from the transceiver (physical layer) are transferred by way of the adaptation layer to the MAC layer. The transmission takes place synchronously with respect to the clock signal RX_CLK. Of the MII_RXD signals, MII_RXD <0> represents the bit with the lowest place value. The data received from the transceiver (physical structure) are converted in a clock-synchronized manner with respect to the RX_CLK cycle from a serial signal into a parallel signal MII_RXD <3:0>.

RX_ER:

This signal is signaled by the transceiver (physical layer) and indicates the occurrence of an error. The signal should be set for one or more clock cycles in order to indicate that an error has occurred. The RX_ER signal is to be triggered in a clock-synchronized manner with respect to the RX_CLK signal (for example, coding errors, or any other error which the transceiver is capable of detecting). If the transceiver (physical layer) is capable of detecting errors and indicating the latter, the adaptation layer will indicate the error case by setting the RX_ER (HIGH) signal.

CRS:

This signal should be set when the transceiver (physical layer) is in the "non-idle" condition. This signal does not have to take place in a clock-synchronized manner with respect to the TX_CLK or RX_CLK signals. The transceiver (physical layer) should have a Flex_RX_EN connection, so that the CRS signal is set as soon as the Flex_RX_EN signal is set (HIGH), and is set back if this signal is LOW.

COL:

This signal has the purpose of indicating when collisions have occurred on the transmission medium.

MDC:

This signal represents the time base/clock for the MDIO signal. It represents a periodic signal which has no maximal HIGH or LOW time durations. The minimal HIGH or LOW time durations should amount to 160 ns. The minimal period of this signal should be 400 ns, irrespective of the RX_CLK and TX_CLK signals. This clock signal is provided by the adaptation layer.

MDIO:

This signal represents a bidirectional control channel between the MAC and the transceiver (physical layer). The latter is used for exchanging control and status information. These data are exchanged in a clock-synchronized manner with respect to the MDC signal. In the adaptation layer, this functionality is implemented conformal to the standard specified in 802.3.

In addition to the above-mentioned network nodes illustrated in FIG. 1, additional network nodes may be provided. In the following, various communication network topologies by which the FlexRay network nodes according to the invention can be mutually connected will be explained in detail.

First, two examples of the networking of FlexRay network nodes according to the invention by way of a shared medium will be explained.

Figure 3:
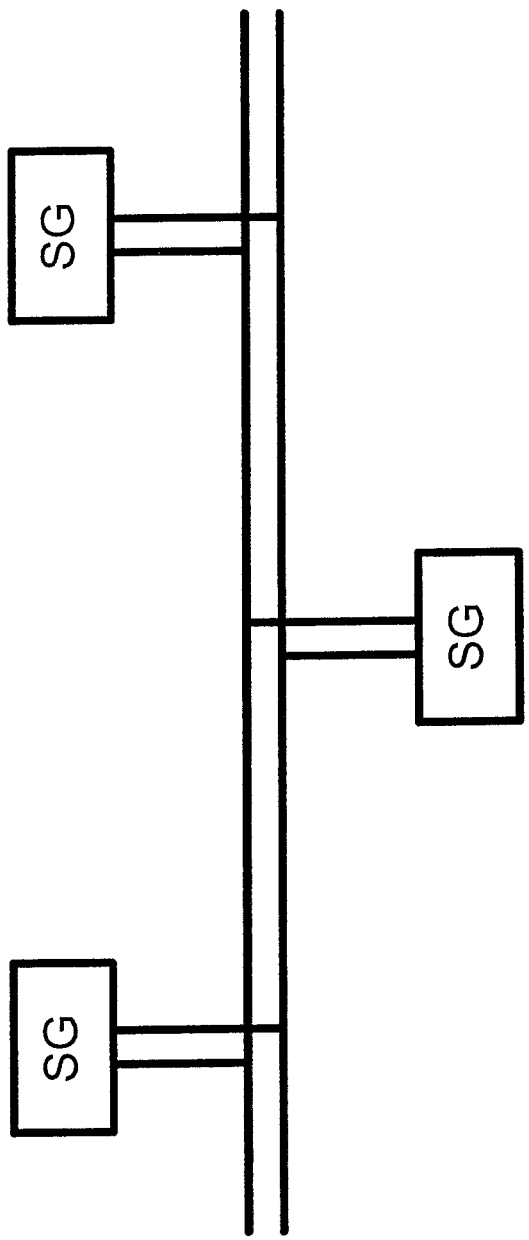
FIGS. 3 to 6 are views of schematic representations of communication system architectures.

FIG. 3 illustrates a line topology. For reasons of simplicity, here and in the following figures, only the corresponding control unit SG of the FlexRay network nodes according to the invention is shown and mentioned, which FlexRay network nodes are mutually connected by way of a shared line and by way of stubs. At any point in time, precisely only one control unit always accesses the physical transmission medium in a writing manner.

Figure 4:
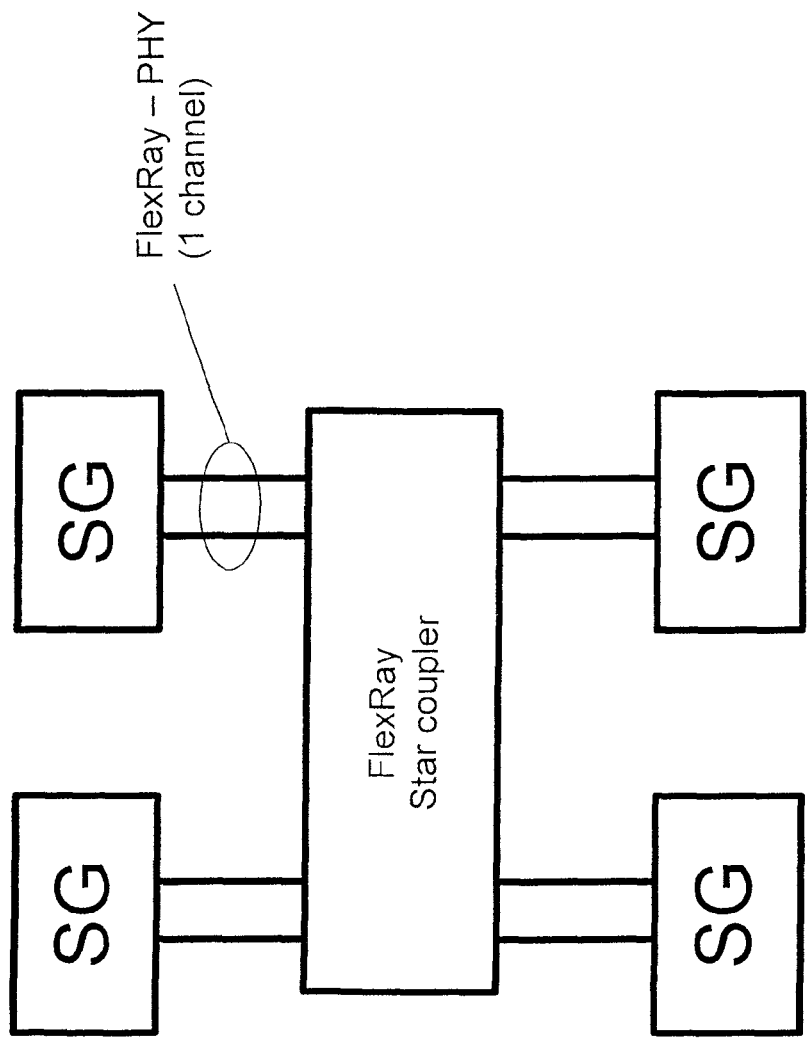

FIG. 4 illustrates a star topology based on a FlexRay star coupler. The control units SG are mutually connected in a star-shaped manner by way of a FlexRay star coupler (see FlexRay specification). The star coupler regenerates the incoming signals and forwards them to all other control units SG connected to the star coupler. As in the case of the line topology, here also, the transmission takes place by way of a shared medium. Precisely only one control unit is allowed to access the shared medium at any point in time. A mixture of the topologies according to FIGS. 3 and 4 can also advantageously be put into practice.

In the following, two examples of the networking of FlexRay nodes according to the invention by way of separate media will be explained.

Figure 5:
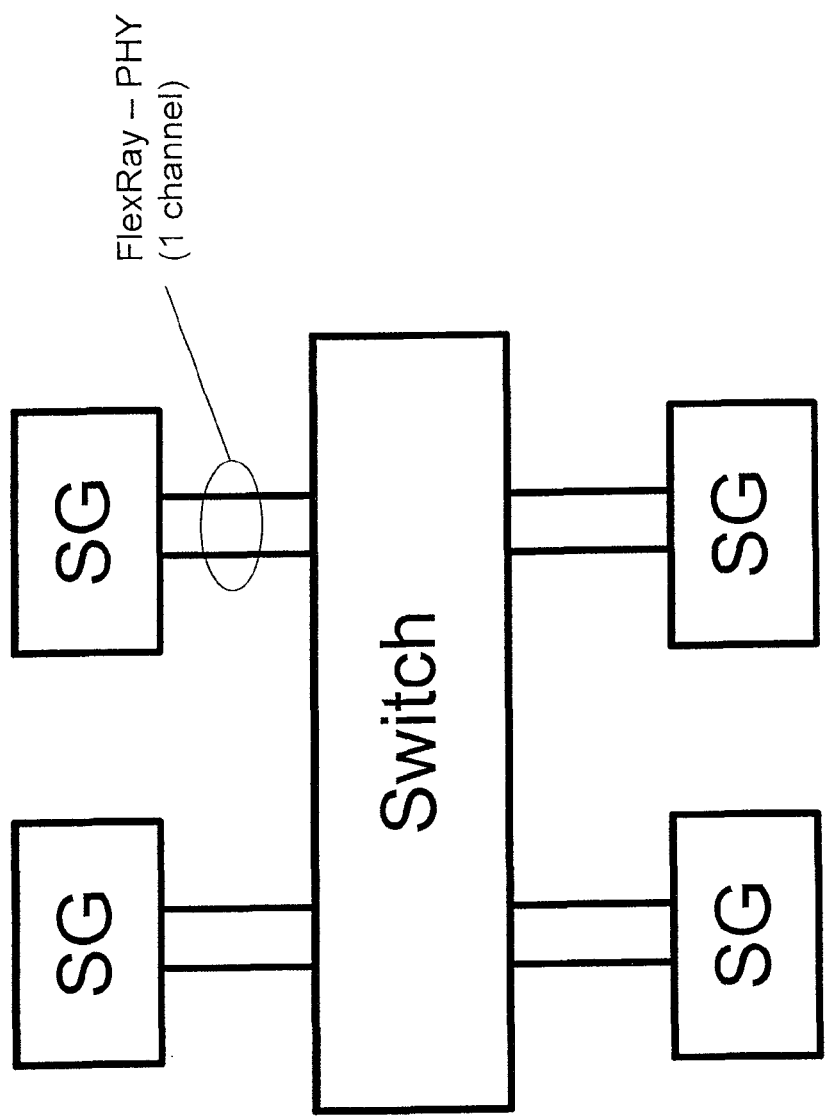

FIG. 5 illustrates a star topology in the half-duplex operation. The control units SG are connected to a switch by way of the FlexRay PHY (1 channel). The switch carries out a switching of the data which are transmitted by way of the FlexRay PHY. The switch can, for example, carry out the switching by an Ethernet destination address or an IP destination address. In contrast to the FlexRay star coupler, incoming data packets are therefore not automatically transmitted to all connected devices but only to those to which the data packets are addressed. Only one channel is used for the communication between the control unit and the switch. This means that always only either the switch or the control unit can access the channel in writing manner. The system therefore operates in a half-duplex mode.

Figure 6:
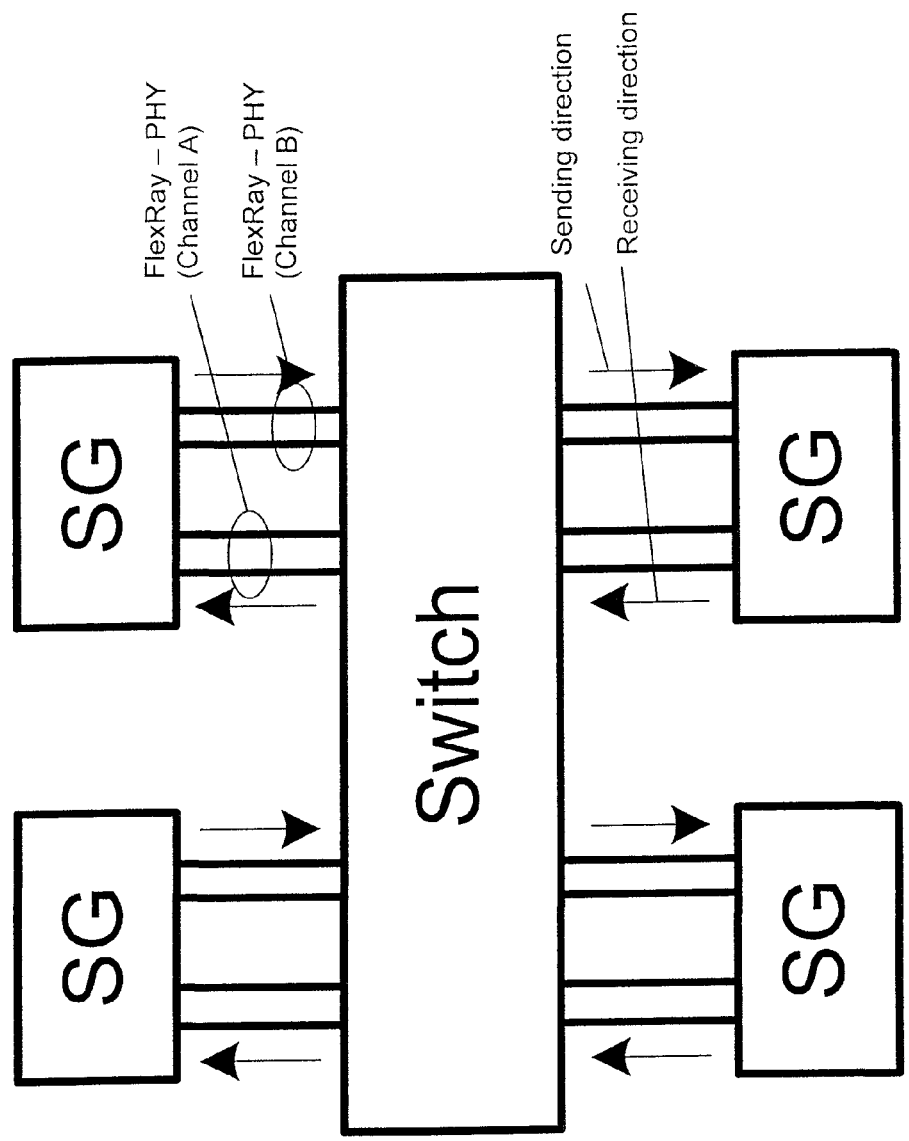

FIG. 6 shows a star topology in full-duplex operation. The control units SG are connected to a switch by way of two separate physical FlexRay channels (FlexRay PHYs, channel A and channel B). In this case, one of the FlexRay channels is used for sending, the other is used for receiving. This means that the switch as well as the control unit can simultaneously send and receive at any point in time and therefore work in the full-duplex mode. As a result of the full-duplex mode, a media access process, such as the CSMA, may possibly not be necessary because the connected devices are permitted to send at any point in time.

Summarizing, one or more of the following advantages can therefore be achieved by means of the invention or its further developments:

(1) The use of an automotively suitable transmission process for the IP communication;

(2) the construction of a simple and cost-effective line topology for the IP communication;

(3) the construction of a simple and cost-effective star topology for the IP communication;

(4) as a result of the standard MII interface, a simple linking of the new process to already existing systems becomes possible;

(5) cost effectiveness, because, in the future, FlexRay communication will be implemented in many microcontrollers and only a subset of the FlexRay functionality will be required;

(6) more simplicity and less complexity in comparison with the standard FlexRay (no synchronization, no time-controlled transmission).

(7) as a result of this solution, it becomes possible to convert a cost-effective line topology or star topology as a supplement to a switched IP network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system, comprising:
 a FlexRay bus system having a physical layer by which data are transmitted;
 a plurality of FlexRay network nodes by which respective data packets are provided over the physical layer of the FlexRay bus system while in an IP data packet format or an Ethernet data packet format, said IP data packet format or the Ethernet data packet format each having a plurality of bit positions;
 wherein each FlexRay network node comprises:
  a media access layer configured such that the data provided in the IP data packet format or the Ethernet data packet format are converted into a preset media-independent data format; and
  an adaptation layer operatively configured such that data packets provided in the media-independent data format are converted onto corresponding signals of the physical layer of the FlexRay bus system, wherein, via the adaptation layer, contents of said bit positions of the data provided in the media-independent data format are each converted onto corresponding signals of the physical layer of the FlexRay bus system.

2. The communication system according to claim 1, wherein a FlexRay network node further comprises a communication control device operatively configured such that the physical layer of the FlexRay bus system includes a first and a second physical channel.

3. The communication system according to claim 2, wherein said communication control device is operatively configured such that data are sent by way of the first channel and received by way of the second channel.

\* \* \* \* \*